March 27, 1945.    W. E. SMITH    2,372,298
FLAME HARDENING APPARATUS
Filed March 14, 1941    7 Sheets—Sheet 7

INVENTOR.
WILLIAM E. SMITH

Patented Mar. 27, 1945

2,372,298

UNITED STATES PATENT OFFICE 2,372,298

FLAME HARDENING APPARATUS

William E. Smith, Detroit, Mich., assignor to The Midland Steel Products Company, Cleveland, Ohio, a corporation of Ohio Application March 14, 1941, Serial No. 383,286

14 Claims. (Cl. 266—5)

This invention relates to new and useful improvements in flame hardening apparatus and the primary object of the invention is to provide apparatus in which the flame hardening torch is guided by the work to move horizontally and vertically as well as angularly or in all three of such directions simultaneously to follow any contour which the work piece may possess.

Another important object of the invention is to provide an apparatus which will automatically follow any contour and angle of the work surface with the flame hardening jets always disposed at approximately 90 degrees to the surface of the work.

A further object of the invention is to provide a track as one arm of a pantograph which is guided to and fro by the work piece and to provide a torch structure mounted upon a carriage upon such track so that engagement of the torch with the work piece, causes both the torch and track to move relative to the work while the torch carriage is being constantly propelled relative to the work.

A further object of the invention is to provide in such an apparatus, a relative arrangement of parts whereby the torch carriage is substantially balanced upon a monorail track thereby to render it exceedingly mobile over the work piece.

Still another object of the invention is to provide the torch with a fuel supply conduit which inherently serves to maintain the torch in the proper spaced relationship to the work piece.

Another object of the invention is to provide improved constructions for the torches.

Other objects and advantages of the invention will become apparent during the course of the following description.

In the accompanying drawings forming a part of the application and wherein like numerals are employed to designate like parts throughout the several views.

Figure 1:
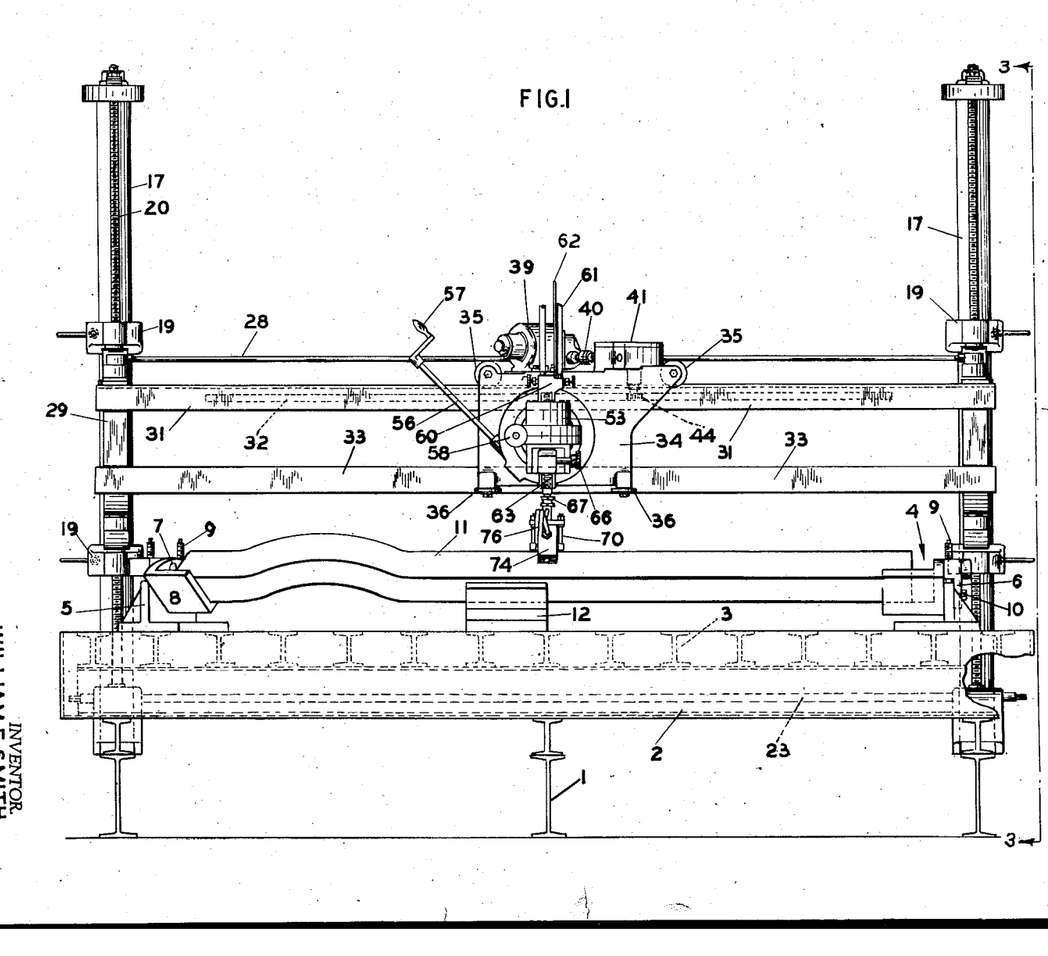
Fig. 1 is a front elevation of the flame hardening apparatus.
Figure 2:
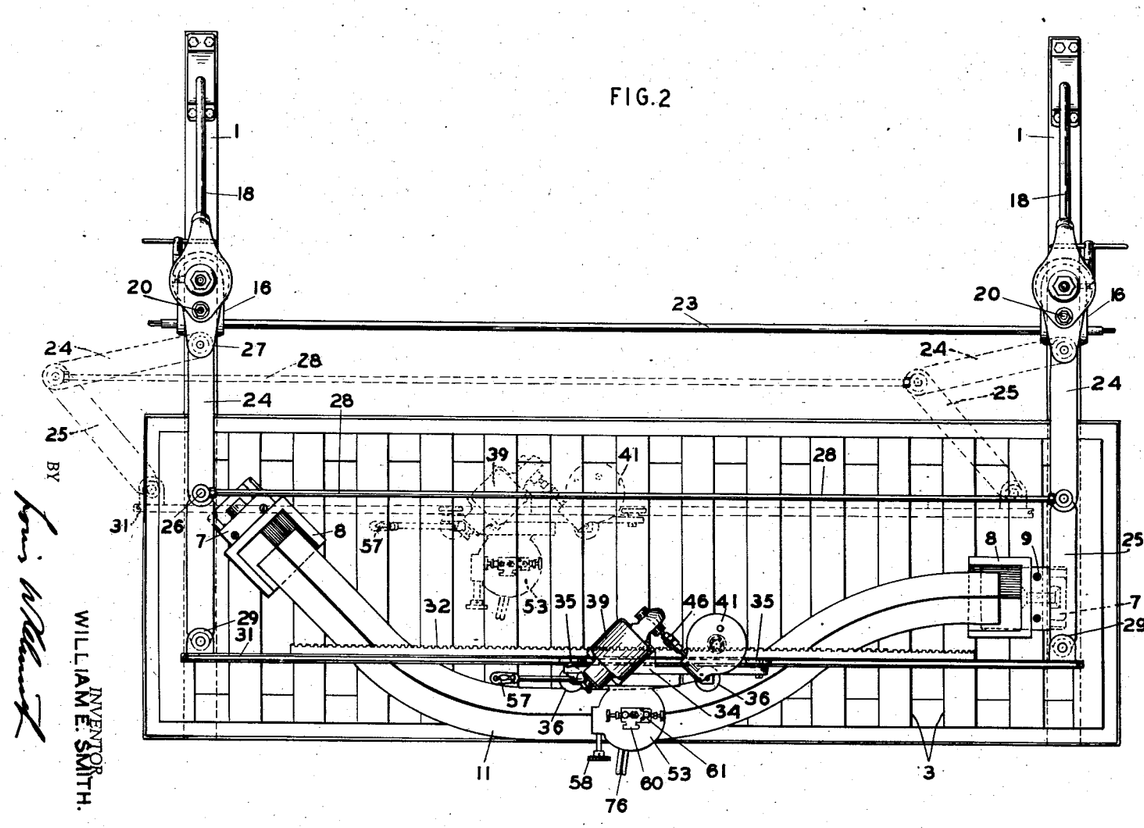
Fig. 2 is a top plan of the same.

This invention provides an apparatus which may be employed for welding, flame hardening or cutting operations along irregular lines or planes and requires no templates or fixtures to provide for the path of movement of the automatic apparatus, since the work itself provides such path. In addition, the torch will automatically change its angle with the change of angle of the work without requiring stopping of the apparatus and changing of tips. In all universal movements of the torch while it is traversing the entire length of the work, the torch tips or jets are maintained at an angle of substantially 90 degrees to the work to be most effective. In order to require minimum universal movement of the torch, universally adjustable work holders are provided to permit positioning of the work so that the surfaces to be treated can be held to a line requiring the least shifting of the torch during its automatic travel. For this purpose, the bed of the apparatus is composed of a plurality of I beams 1, transversely upon which are positioned a plurality of transverse I beams 2, superimposed upon which at right angles thereto are a plurality of equally spaced I beams 3, upon any of which, at any points in the area of the bed, may be clamped a pair of work holders 4 at opposite ends thereof. Each work holder has an inverted T-shape piece 5, upon the vertical stem of which is a vertically adjustable slide 6, in which is mounted a horizontal pivot pin 7 for the pivotal suspension thereon of a V-shaped work holding trough 8. The work holding trough 8 may be adjusted about its axis 7, and held at the desired angle and elevation by a pair of set screws 9 extending through the slide 6 and engaging the uppermost end of the base of its stem, and by clamping bolts 10. The ends of a work piece are positioned in the trough shaped holders 8 at opposite sides of the bed and after the holders are adjusted to properly support the work in such position requiring minimum movement of the torch, additional supports 12 may be placed under the intermediate portions of the work to effectively support it against any shifting movement. As illustrated herein, the work piece may take the form of a die substantially square in cross section, which when positioned in the work holder presents one corner 13 which is to be flame hardened uppermost between a pair of adjacent side faces 14 and 15. It is to be particularly noted that these adjacent faces 14 and 15 need not be at right angles to each other throughout the length of the work piece, but their angles may vary through the length of the work piece, from less than 90 degrees, all the way up to 180 degrees without necessitating stopping and resetting of the apparatus or the changing of torch tips as the apparatus moves from one end of the work to the other. In addition, the work piece may possess curvatures in horizontal planes as shown in Fig. 2, or in vertical planes as shown in Fig. 1; the apparatus being adaptable to effectively operate upon any contours whatsoever.

Figure 3:
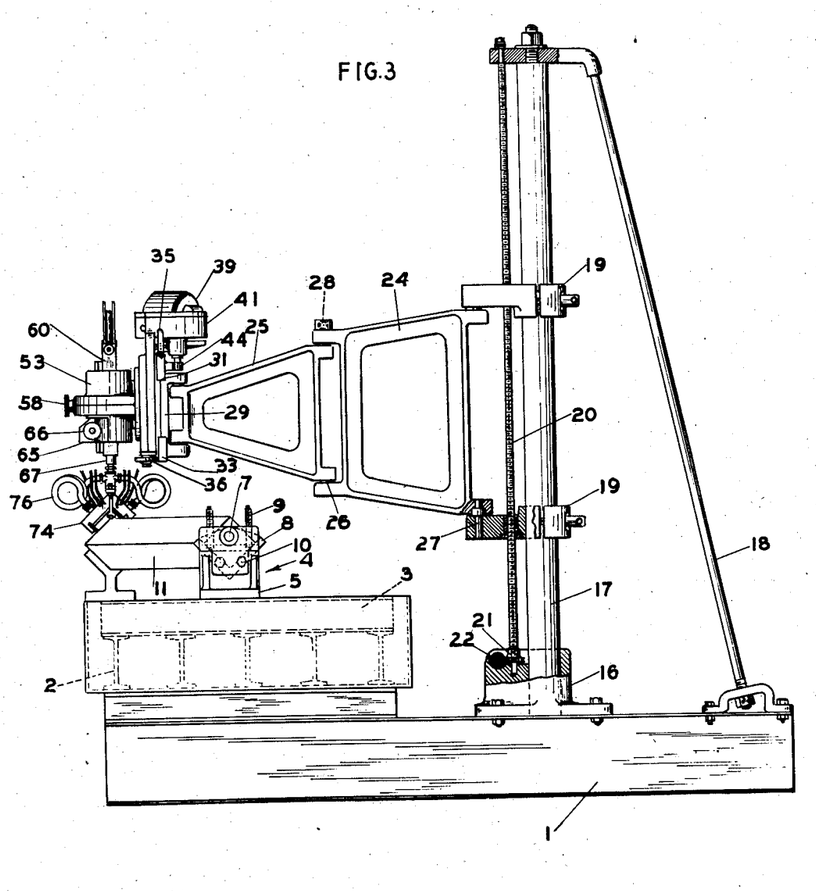
Fig. 3 is an end elevation of the same.
Figures 4, 5:
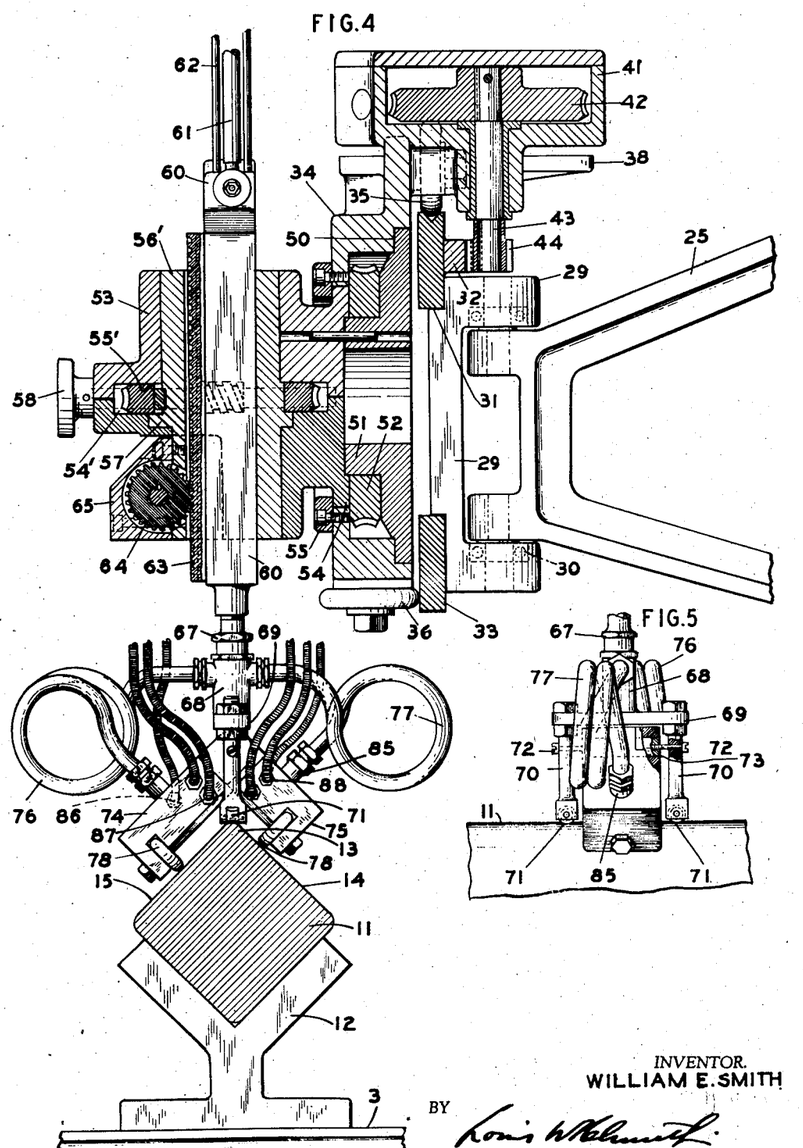
Fig. 4 is an enlarged elevation of the torch carrying carriage with parts thereof shown in section and with the torch engaging the work.
Fig. 5 is an elevation of the torch head with parts thereof broken away to show the pivotal mounting of the pair of torches.
Figures 6, 7, 8, 9, 10, 11, 12, 13:
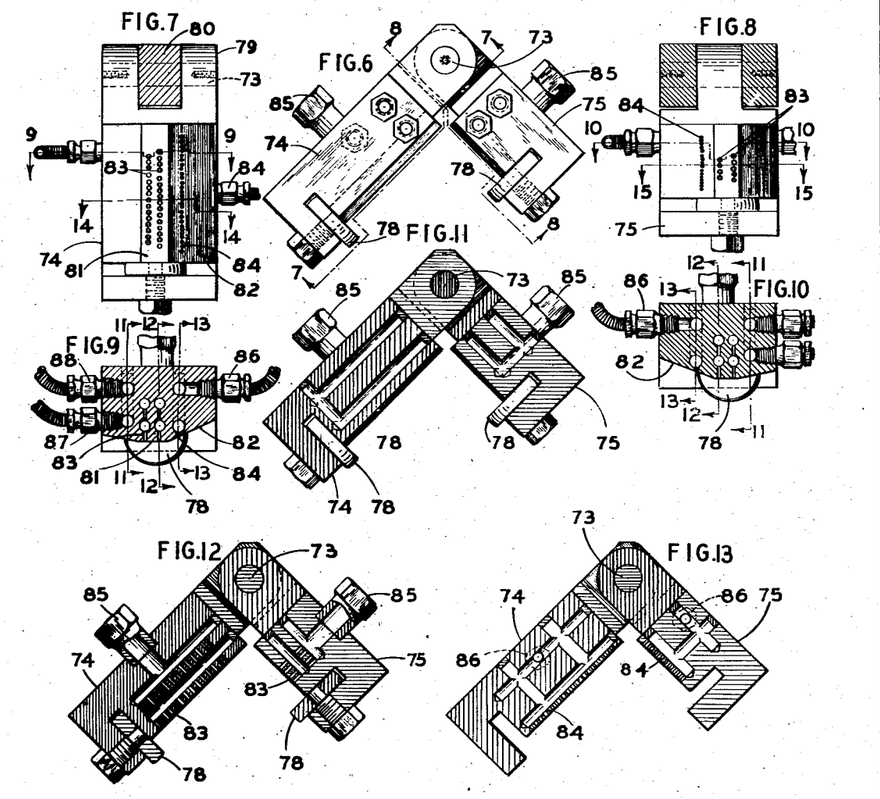
Fig. 6 is an enlarged side elevation of the torches shown in Fig. 4.
Fig. 7 is a transverse section thereof taken on the line 7—7 of Fig. 6.
Fig. 8 is a similar section taken along the line 8—8 of Fig. 6.
Fig. 9 is a transverse section taken along the line 9—9 of Fig. 7.
Fig. 10 is a transverse section taken along the line 10—10 of Fig. 8.
Fig. 11 is a longitudinal section taken through the two torches on the lines 11—11 of Figs. 9 and 10.
Fig. 12 is a similar section taken along the lines 12—12 of Figs. 9 and 10.
Fig. 13 is a similar section taken along the lines 13—13 of Figs. 9 and 10.
Figure 14:
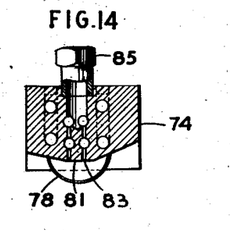
Fig. 14 is a transverse section taken along the line 14—14 of Fig. 7.
Figure 15:
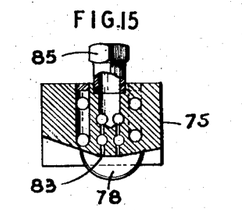
Fig. 15 is a transverse section taken on the line 15—15 of Fig. 8, Figs. 16 to 24 are views and sections of a modified form of torch head to produce ribbon-like flames.
Figures 16, 17, 18, 19, 20, 21, 22, 23:
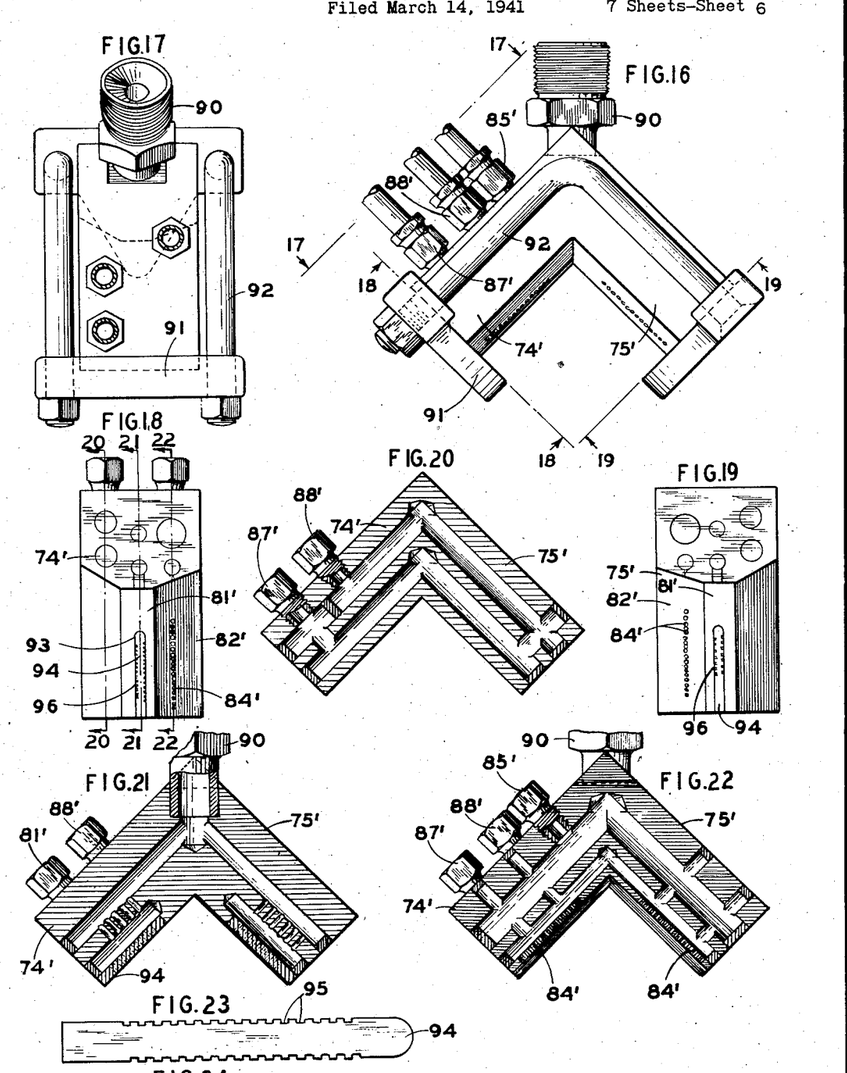
Figure 24:
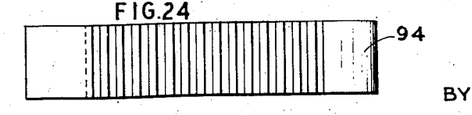

Upon the beams 1, are bolted a pair of pedestal feet 16 for a pair of tubular pedestals or uprights 17 suitably truss braced with adjustable rods 18 extending from cap pieces to the base, as shown in Fig. 3. A pair of vertically spaced adjustable brackets 19 are slidable upon each upright post 17. A threaded rod 20 passes vertically through each pair of these adjustable brackets and is journaled at its top in the cap piece and at its bottom in the foot piece 16 where it is provided with a worm wheel 21 meshing with a worm 22 provided at each end of a rod 23 extending through each of the foot pieces 16 and terminates in a squared end whereby a crank may be applied to either end for rotating the shaft 23 and the screws 20 to vertically adjust the pair of brackets 19 to the desired elevation to fit the particular work to be performed. A parallelogram structure includes a pair of links 24 and 25 pivotally connected together as at 26 and the joint is provided with thrust bearings 26. The link 24 is pivoted at its inner end on a vertical axis 27 between the vertically aligned adjustable bracket 19 whereby the two links may freely swing and pivot in a horizontal plane. The pairs of links 24 and 25 at opposite sides of the apparatus are caused to move in unison by means of a rod 28 connecting the pivots 26.

A track supporting bracket or link 29 is pivoted on a vertical axis to the free end of each link 25 and suitable thrust bearings 30 are provided to ease the pivoting of the joint. A track 31 extending the entire length of the bed of the apparatus is secured at opposite ends to the two brackets 29 and thus the two arms 25, rod 28 and track 31, form a parallelogram structure which is bodily movable horizontally in any direction. The upper face of the track 31 is provided with a V tread surface and a continuous rack bar 32 is secured to the inner vertical face of this track. The lower portions of the brackets 29 are interconnected rigidly by a vertically disposed guide rail 33 placed in the same vertical plane as the upper track 31. Thus, the track 31 and connecting rod 28 form the two longitudinals of a parallelogram, the side links of which are constituted by the links 25 whereby the track 31 can move back and forth and sideways in any horizontal plane to which it is adjusted across the bed of the apparatus. This is indicated in dotted lines in Fig. 2.

Mounted to be propelled lengthwise upon the track 31 and lengthwise of the work therebeneath, is a flame treating torch carriage 34 having a pair of rollers 35 on horizontal axes at opposite ends of the carriage to ride in the V-shaped tread surface of track 31. Thus, the entire weight of the carriage is disposed upon the track 31 and the carriage is prevented from tipping over to its heavier side by the provision of a pair of guide rollers 36 mounted in vertical axes at the lower edge of the carriage engaging the vertical outer face of the lower guide rail 33. This carriage is provided with a horizontal shelf 38 overhanging the track 31 for the support of a reversible variable speed electric motor 39 set on the platform diagonally across the track so that the power is delivered from one end on one side of the track through a "Boston" coupling 40 to a shaft extending into a substantially circular gear housing 41 which has its center disposed to one side of the track 31 as best shown in Fig. 2. A suitable worm driven from the motor meshes with a worm wheel 42 keyed to a vertical shaft 43, depending through a suitable bearing to the right side of the track 31 and to a point opposite the same where it is provided with a spur gear 44 for meshing with the track rack 32 for constantly propelling the carriage 34 across the bed of the apparatus and the work disposed thereon. The operator may hold the track 31 with his hands or otherwise suitably bias the pantographic system 24, 25, 28, 31 to prevent any tendency of the track from being moved back through the carriage 34 rather than the carriage being moved longitudinally upon the track. The weight of the housing 41 and motor 39 to one side of the track 32 is somewhat counterbalanced by the supporting structure on the opposite side of the track for the torch mechanism.

For supporting the torch laterally of the carriage, the latter is provided with a circular chamber having an annular shoulder 50 against which abuts the flange of a hub 51 carrying a worm wheel 52. The hub 51 is secured to and rotates with a laterally extending housing 53 made up of upper and lower sections suitably bound together and having an annular flange 54 rotatably held in the carriage 34 by a removable ring 55. The worm wheel 52 meshes with a worm carried by a diagonally extending shaft 56 having a hand crank 57 by which the hub 51 and torch support are rotated or oscillated upon a horizontal axis with the flanges 50 and 54 forming the bearings for such movement. This angular adjustment is provided for initially setting the torch at the most advantageous angle to the work to be performed in order that the torch will only have to execute the minimum movements during its automatic travel. The lateral torch support 53 is provided with a central horizontal chamber 54' to house a worm wheel 55' keyed to a quill or sleeve 56' having an annular shoulder 57 to support it for rotation with the worm wheel within the support 53. A worm shaft meshing with wheel 55' is provided with a handle 58 whereby the quill 56 can be manually oscillated on a vertical axis to turn the torch in a horizontal plane.

A gas mixing chamber 60 polygonal in cross section, is vertically adjustable through the quill 56 and suitable air and gas pipes 61, each individually controlled by a valve, lead into the mixing chamber to supply the same with a combustible gas, usually air and acetylene gas. Suitable cooling fluid pipes 62 are also led into the top of the gas mixing chamber to maintain it at the proper temperature. While this mixing chamber is automatically moved vertically by the work during travel of the carriage across the work, provision is also made for manually raising or lowering it by providing the chamber with a vertical rack 63 meshing with a spur gear 64 housed within a suitable casing 65 secured to the lower portion of the quill. A handle 66 is provided to facilitate the manual raising and lowering of the mixing chamber.

The lower end of this chamber 60 is provided with a coupling 67 for connecting with a T-connection 68 which is provided with a pair of oppositely extending arms 69, from the free end of each of which depends a standard 70 having a roller 71 in its lower end to engage and roll upon the uppermost corner of the work. Thus, it will be seen that this mounting of the mixing chamber equips it with means for automatically compensating or following the vertical variations in elevation of the work piece 11. Extending transversely through the standards 70 are a pair of aligned screws 72 which pass axially into opposite ends of a pivot pin 73 forming the horizontal common axis or hinge joint for the two sections 74 and 75 of the torch.

Each torch section is supplied with a combustible gas mixture through a resilient copper coiled conduit 76 having a couple of turns between its ends, one end of which is connected to the torch 74 while the opposite end of the coil is connected with the T-connection 68. A similar coil 77 is provided for supplying the torch section 75 with a combustible mixture and it will be seen, due to the pivotal arrangement of the torch sections that these coils normally resiliently urge the two sections 74 and 75 of the torch to swing toward each other on their common pivot 73 and are resiliently pressed against the work. The free ends of the torch sections are provided with work engaging rollers 78 which are adapted to engage with opposite adjacent faces 14 and 15 of the work piece defining the corner 13 of the work to be treated or flame hardened. With this construction, it will be obvious that the angularity of the two torch sections 74 and 75 will automatically vary according to the variance of the angle between the two work faces 14 and 15, thereby maintaining uniformity of distance between the work and torches as well as a substantial 90 degree disposition of the jets of the torches with the work. The torch section 74 is provided with a bifurcated upper end 79 which straddles the projection 80 at the upper end of torch section 75 so that both torch bodies are arranged in the same vertical plane and will cover corresponding portions of the work surfaces on opposite sides of the work corner. Each torch section is provided with a bottom surface 81 parallel with the face of the work against which it is directed, and an angular adjacent face 82 which is arranged at approximately an angle of 20 degrees to the work face being treated. Extending through the bottom face 81 are two rows of gas jet orifices 83 which are drilled with a number 67 drill and the orifices in the two lines of openings are staggered with respect to each other to form as nearly a ribbon-like uninterrupted flame as is possible with separated orifices. The inclined face 82 of the torch section is provided with a line of orifices 84 which is parallel to the lines of orifices 83. However, the orifices 84 are arranged normal to the inclined face and are preferably made with a No. 70 drill to spray the quenching or cooling fluid upon the work in a direction pointing somewhat away from the orifices 83 and upon the work just previously heated by the impingement of the flames from the orifices 83. Each torch section is provided with a gas inlet union 85 to be connected with its respective gas conduit 76 or 77 to supply combustible gas to the orifices 83. A quenching fluid is led to each torch section through a coupling 86 to an internal chamber supplying the orifices 84. Each torch section is also provided with coolant inlets and outlets 87 and 88 for circulating a coolant through a cooling chamber in each section. Since the construction of the passages through the torch sections is well known, a further description thereof is unnecessary.

The torch shown in Figs. 16 to 24 inclusive is not composed of a pair of relatively movable sections as in Figs. 7 to 15, but the sections 74' and 75' are rigidly connected together at a 90 degree angle and have a common gas supply nozzle 90 for supplying both sections. This type of torch is designed to treat adjacent surfaces which are arranged at a constant unvarying angle of 90 degrees. In order to cause the torch sections to ride upon such surfaces and to maintain the jets at an angle of 90 degrees to the work, a triangular slider block 91 with its apex lowermost to engage the work is recessed to receive the free end of each torch section, and the two slider blocks are clamped on the ends of the torch sections with V-shaped bolts 92 and nuts. Parts of this type of torch corresponding to the type shown in Figs. 7 to 15 are designated with primed corresponding reference numerals. The only differences between the two, are that the gas and coolant chambers of the two torch sections 74' and 75' are connected and supplied with common supply pipes since the torch sections are integrated, and in place of the round gas orifices 83 of Figs. 7 to 15, the sections 74' and 75' are provided with means for creating ribbon-like gas flames. As best shown in Figs. 18, 21, 23 and 24, this is accomplished by providing each section with a groove 93 extending longitudinally of the face 81' of each section to cut into the internal gas chamber of the section and securing in such groove a flame bar 94 with rectangular notches 95 in opposite edges thereof. These notches are .025 of an inch in width and are spaced the same distance apart to form small rectangular orifices 96 and provide for individual ribbon-like jets and flames which merge lengthwise of the torch section to provide a substantially continuous ribbon-like flame extending lengthwise of torch section. These notches or grooves 95 at opposite sides of the flame bar 94 are staggered relative to one another to provide for an uninterrupted and continuous flame to be moved or swept across the face of the work. The flame bar is preferably silver soldered in its groove as are all other joints between the parts where leakage is to be precluded.

Figures 25, 26, 27, 28, 29:
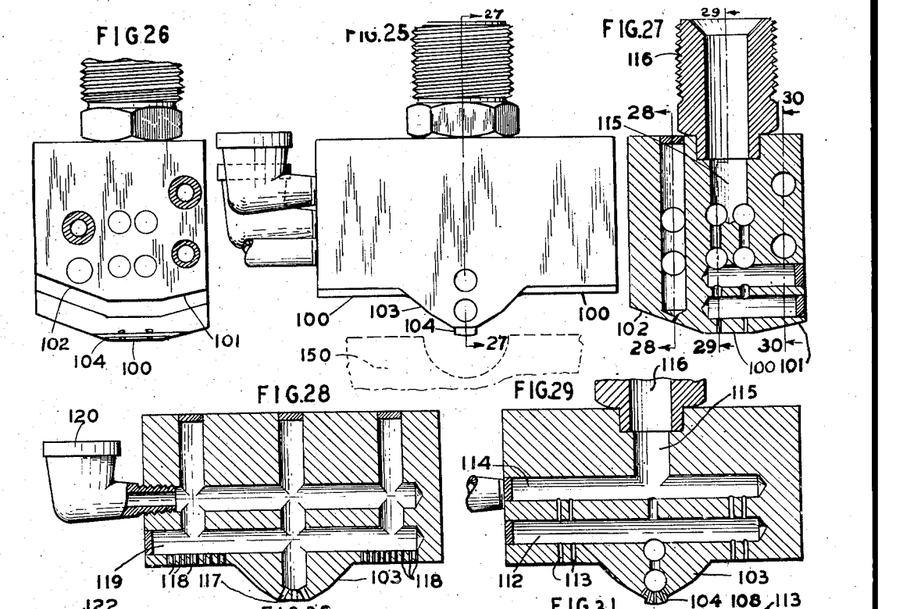
Figs. 25 to 32 are views and sections of another modified form of torch head.
Figures 30, 31:
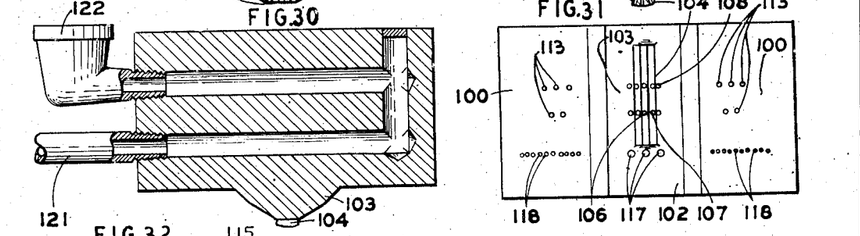
Figure 32:
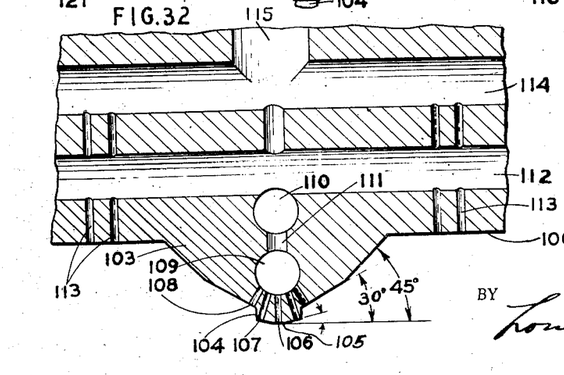

In Figs. 26 to 32 inclusive is illustrated a form of torch for flame hardening concave tube dies as shown in Fig. 25. The bottom surface of the torch is provided with a longitudinally extending horizontal portion 100, a 10 degree inclined portion 101 on one side thereof, and a 20 degree inclined portion 102 on the other side thereof. This longitudinal horizontal portion 100 has its medial part provided with a protuberance 103 making first an angle of 45 degrees with the horizontal face and then an angle of 30 degrees therewith to terminate in a rib-shaped tip 104 normal to the horizontal plane. The face of this tip has a horizontal middle face 105 with a gas orifice 106 normal thereto, and 12 degree faces on opposite sides of the middle face with gas orifices 107 normal thereto. The 30 degree faces of the torch closely adjacent the tips 104 have gas orifices 108 normal thereto. There are two lines of these orifices arranged transversely of the tip as shown in Fig. 31. Thus the torch protuberance 103 has a cross-section somewhat semi-circular to conform somewhat to the semi-circular concavity of the tube die 150 and its gas passages substantially radiate from a longitudinally extending gas passage 109 which is supplied by a parallel passage 110 and connecting ports 111. The passage 110 is intersected by a pair of parallel gas passages 112 extending longitudinally above the horizontal portion 100 of the torch so that rows of gas orifices 113 can extend normal to such passages and break through the horizontal portions 100 on opposite sides of the protuberance 103. The passages 112 are fed gas from a pair of parallel passages 114, both of which communicate with a bore 115, fed from a gas connecting nipple 116. The 20 degree face 102 of the torch is provided with orifices 117 normal thereto for spraying a quenching fluid in the concavity immediately trailing the gas jets 106, 107 and 108. Likewise this same face on opposite sides of its middle portion is provided with a row of liquid orifices 118 to trail the gas orifices 113 and to supply fluid to quench the heated metal of the die on opposite sides of its concavity. Liquid is applied to the orifices 117 and 118 by passage 119 furnished to a nipple 120 from a suitable source of supply. The torch is also provided with a circuitous cooling passage 121 connected at the ends of the circuit with an inlet 121 and an outlet 122 whereby a continuous stream of liquid is kept circulating in the torch to maintain it at proper temperature.

From the foregoing description it is believed that the operation of the apparatus is understood. Various changes in the size, shape and arrangement of parts may be resorted to without departing from the spirit of the invention or the scope of the appended claims.

I claim:

1. An automatic flame hardening apparatus comprising a track supported to move bodily in a horizontal plane, a carriage propelled lengthwise thereupon, a torch carrier supported by said carriage and mounted on a horizontal axis, a torch suspension member being adjustable lengthwise vertically and oscillatable upon a vertical axis and adapted to be guided by the contour of the work, and a torch head adapted to engage the work and being mounted upon said suspension member on a horizontal axis to adapt itself to vertical variations and varying angles of the surfaces of the work being treated.

2. An automatic flame hardening apparatus for treating the corner edge of work comprising a pair of torches pivotally mounted on a common axis adjacent said corner edge and being independently automatically spring urged against adjacent faces of said corner edge to automatically conform to varying contours and angles of said adjacent faces.

3. An automatic flame hardening apparatus for treating the corner edge of work comprising a pair of associated torches independently adjustable to follow varying contours of adjacent surfaces of work forming said corner edge and each of said torches having a resilient coil with its axis longitudinal of said corner edge for feeding gas to the torches and urging the same into contact with said adjacent surfaces of the work.

4. An automatic flame hardening apparatus for treating a lengthwise corner edge of work comprising a vertically adjustable torch carrying member having means engaging the corner edge of the work to vary the elevation of said member according to the elevation of the work as the member is moved lengthwise thereof, and a torch pivotally connected to said member on a horizontal axis longitudinally of the corner and having a roller engaging an adjacent face of the work to swing the torch to the angle of said adjacent face as the torch is moved lengthwise thereof.

5. An automatic flame hardening apparatus comprising a horizontal track and guide rail, said track having a laterally extending rack, a torch carrying carriage having a pair of supporting rollers riding upon said track and a guide roller engaging the vertical side of said guide rail, torch supporting means extending laterally from the carriage upon one side of the track, a gear engaging said rack upon the opposite side of the track, and a drive mechanism for said gear disposed upon the last named side of the track to substantially balance the carriage in monorail fashion upon said track.

6. An automatic flame hardening apparatus comprising a pair of spaced uprights, a pair of pivotally connected links pivotally connected on a vertical axis to each upright, a track support pivotally connected on vertical axes to the free ends of said links, a rod connecting the pivotal connection of the pairs of links causing them to move in unison, a track connecting the track support and being movable in all directions in a horizontal plane, a carriage propelled lengthwise upon said track, and a torch universally supported upon said carriage to engage the work to be guided thereby.

7. An automatic flame hardening apparatus comprising a carriage propelled lengthwise of the work, a torch holder, a pair of supports depending from said holder, a roller mounted in each support adapted to engage the work, and a torch pivotally suspended between said supports and adapted to engage an adjacent face of the corner of the work.

8. A flame hardening torch for corner edges of work comprising a pair of torch bodies, means pivotally connecting said torch bodies together at corresponding ends for substantially free pivotal movement relative to each other, torch guiding means for engaging the work on opposite sides of the corner edge, and resilient means for urging said torch bodies toward each other whereby to maintain said torch bodies in substantially the same predetermined relationship with respect to the work faces on opposite sides of the corner edge.

9. A flame hardening apparatus comprising a carrier member having a gas duct, a torch body having a gas passage, means for connecting the carrier member and torch body for substantially free pivotal movement, and a resilient coiled gas pipe having a normal tendency to uncoil and having one end connected with said duct of the carrier member and the other end connected with said passage in the torch body and tending normally to spring press the body in a predetermined direction, and work engaging means carried by the torch body for positioning the torch body with respect to the work.

10. An automatic flame hardening apparatus comprising a track, means mounting the track for horizontal movement transversely of a work piece, a torch carrier movable along said track, a torch member, means mounting said torch member for vertical movement on said torch carrier, torch guide means operatively associated with the torch and engageable respectively with the vertical and horizontal profile portions of a work piece, and means for maintaining said guide means in contact with the work as the carrier traverses said track to thereby move the torch vertically and horizontally in accordance with variations in the vertical and horizontal profile portions of the work traversed by said torch guide means.

11. An automatic flame hardening apparatus comprising a torch carrier, means for supporting said carrier for movement in all horizontal directions, a torch member, means mounting the torch member for vertical movement on the torch carrier and for pivotal movement about a horizontal axis, said torch member including torch guide means engageable with the work, means for maintaining the torch guide means in contact with the horizontal and vertical profile portions of the work respectively, as the torch carrier is moved lengthwise of the work to thereby move the torch member horizontally and vertically in accordance with variations in the horizontal and vertical profile portions of the work traversed by said guide means, and resilient means tending to rotate the torch member on said horizontal pivot and toward the work to thereby maintain the torch member in predetermined relation to said work.

12. An automatic flame hardening apparatus comprising a pair of spaced uprights, a pantographic linkage pivotally supported thereon for movement about vertical axes and comprising a plurality of arms pivotally connected at the corners of the pantographic linkage, one arm of said linkage constituting a track horizontally movable transversely of a work piece, a carriage propelled lengthwise upon said track and a torch supported upon said carriage together with means for mounting the torch for relative vertical movement with respect to the carriage, torch guide means operatively associated with said torch means and positioned to engage respectively the vertical profile portion and opposed horizontal profile portions of the work, means for maintaining said torch guide means in operative engagement with the vertical and opposed horizontal profile portions of the work whereby the torch is moved vertically and horizontally in accordance with variations in the vertical and horizontal profile portions of the work as the carriage is propelled along said track.

13. An automatic flame hardening apparatus for treating an irregularly curved work piece comprising a torch member having an operating surface disposed substantially parallel to the work face of a work piece and including means engageable with opposed horizontal profile portions of the work piece, means for propelling said torch member in a rectilinear path lengthwise of the work piece and in contact therewith, means for mounting said torch member for horizontal movement transversely of the work piece and pivotally about a vertical axis and about a horizontal axis disposed lengthwise of and above the work piece, means for maintaining the torch member in contact with the work at all times whereby said torch member is moved in all directions horizontally by guiding contact with the work piece, and resilient means urging said torch member about said horizontal axis and toward said work whereby said operating face of the torch is maintained at all times substantially parallel to the work face of the work piece.

14. An automatic flame hardening apparatus for treating an irregularly curved work piece comprising a torch member having an operating surface disposed substantially parallel to the work face of a work piece, said torch member being provided with work engaging means including spaced means for engaging opposed horizontal profile portions of the work piece and means for engaging the vertical profile portion of the work, means for propelling said torch member in a rectilinear path lengthwise of the work piece and in contact therewith, means for mounting said torch member to move vertically and horizontally of the work piece and pivotally about a vertical axis and about a horizontal axis disposed lengthwise of and above the work piece, means for maintaining contact between said work engaging portions of the torch member and the vertical and horizontal profile portions of the work piece at all times whereby said torch member is moved vertically and horizontally in accordance with the variations in the vertical and horizontal profile portions of the work piece as the torch member is moved lengthwise of the work piece and resilient means urging the torch member about said horizontal axis and into contact with the work face whereby said operating face of the torch member is maintained at all times substantially parallel to the work face of the work piece.

WILLIAM E. SMITH.